July 15, 1941.  D. KAHN ET AL  2,249,004
METHOD OF AND APPARATUS FOR TREATING THERMOPLASTIC TUBES
Filed Oct. 31, 1935  3 Sheets-Sheet 1
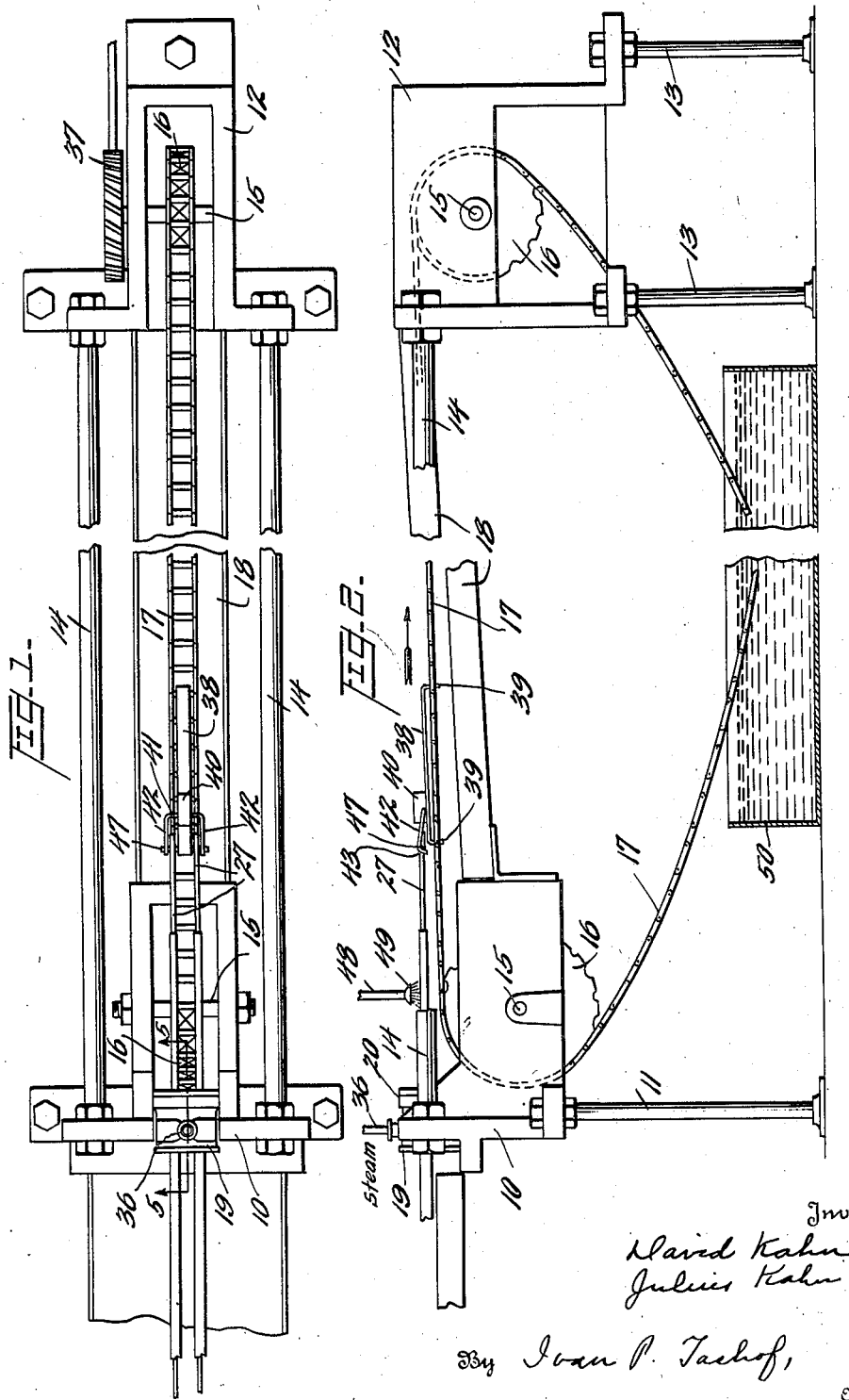

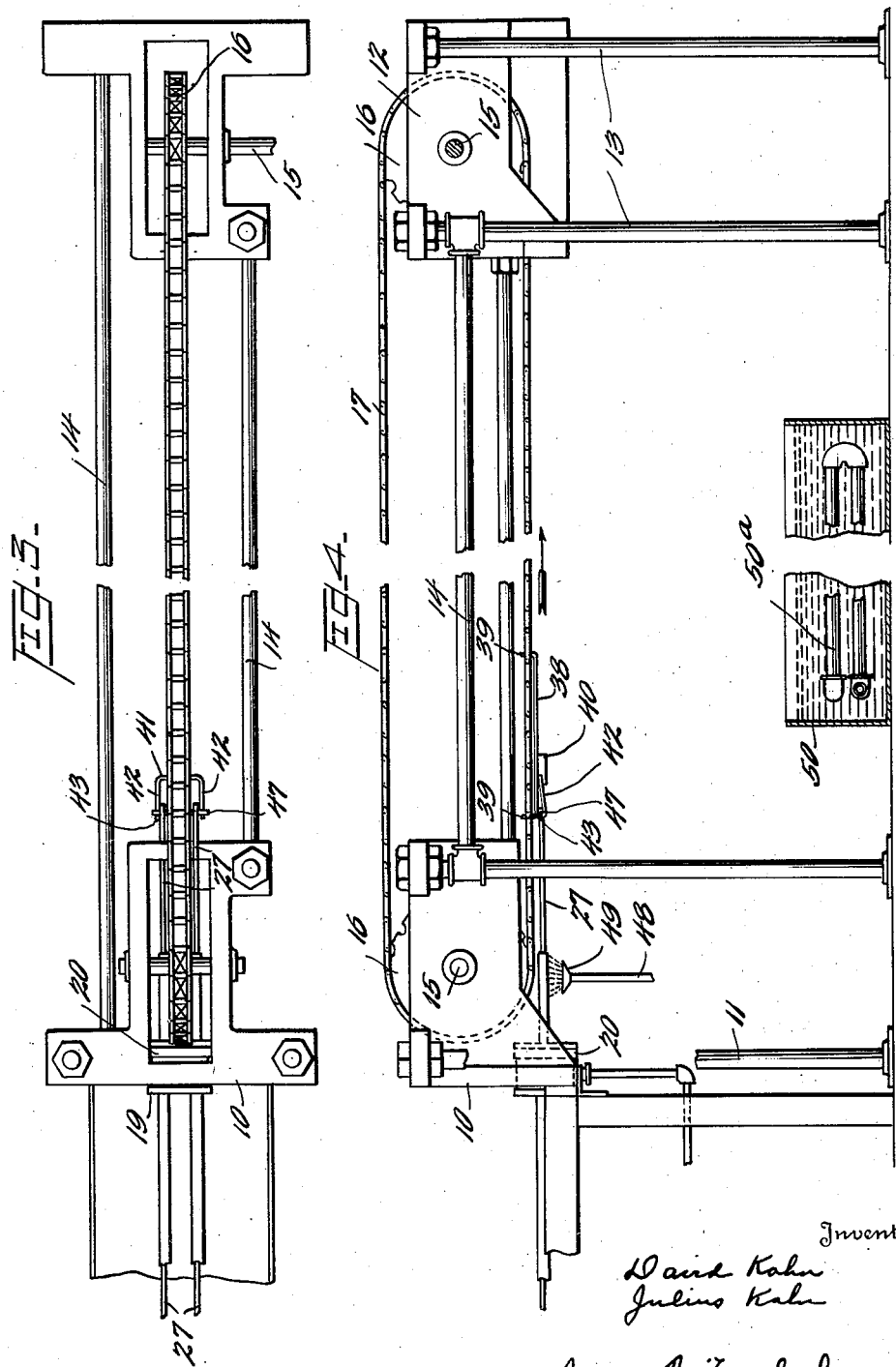

July 15, 1941. D. KAHN ET AL 2,249,004
METHOD OF AND APPARATUS FOR TREATING THERMOPLASTIC TUBES
Filed Oct. 31, 1935 3 Sheets-Sheet 3
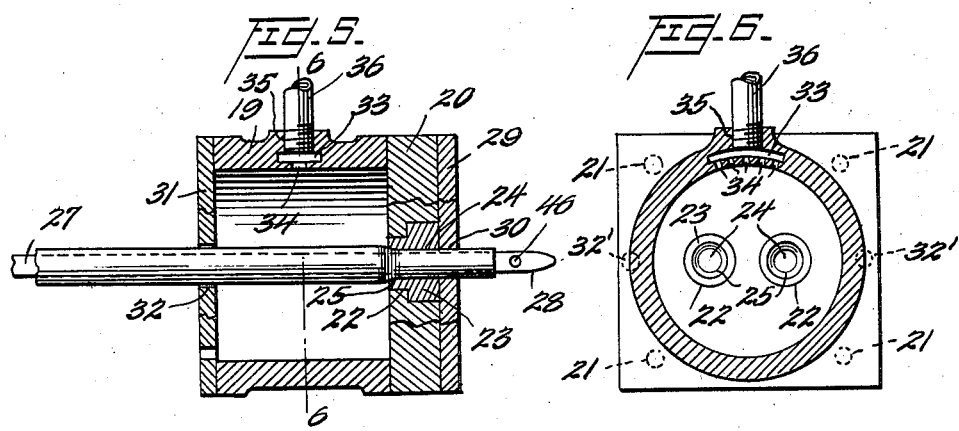
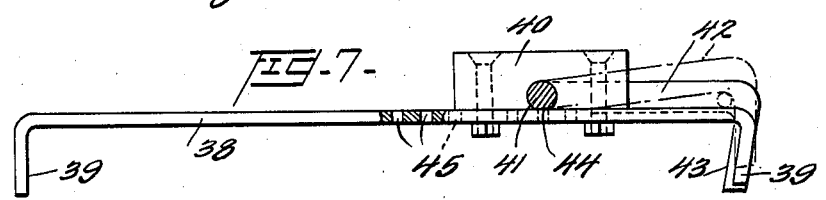
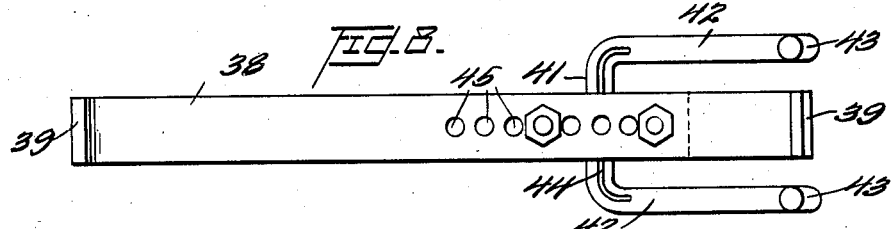
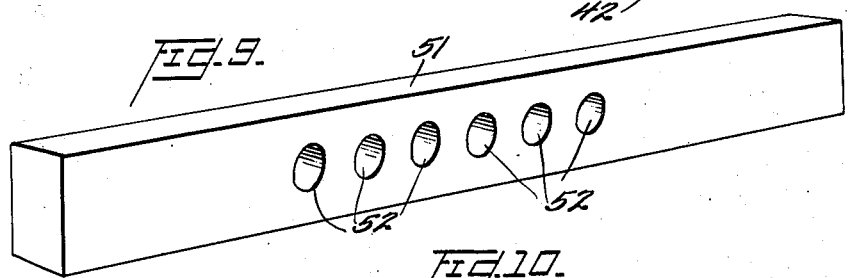
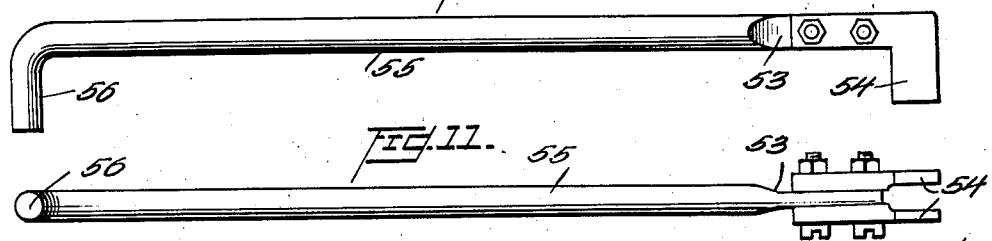

Patented July 15, 1941

2,249,004

UNITED STATES PATENT OFFICE 2,249,004

METHOD OF AND APPARATUS FOR TREATING THERMOPLASTIC TUBES

David Kahn and Julius Kahn, North Bergen, N. J., assignors to David Kahn, Inc., North Bergen Township, Hudson County, N. J., a corporation of New Jersey Application October 31, 1935, Serial No. 47,704

8 Claims. (Cl. 18—5)

This invention relates to a method and apparatus for treating and drawing tubes of thermoplastic material.

The term "thermo-plastic" as used herein includes materials such as Celluloid, pyroxylin, nitro-cellulose, acetyl cellulose and casein compositions as well as such other materials which are softened and rendered plastic by the application of heat.

One important object of the invention is to provide an improved method of drawing tubes of thermo-plastic material wherein the material is first rendered plastic and is then retained in its plastic state throughout the drawing operation.

A second important object of the invention is to provide an improved method of drawing tubes of thermo-plastic material wherein the mandrel and die used in the drawing operation are maintained throughout the drawing operation at equal temperatures.

A third important object of the invention is to provide an improved method of drawing tubes of thermo-plastic material wherein the material and the mandrel and die used are maintained at equal and uniform temperatures throughout the drawing operation.

A fourth important object of the invention is to provide an improved drawing bench for drawing thermo-plastic tubes and having a novel means for supplying heat to the material, the mandrel and the die.

A fifth important object of the invention is to provide an improved drawing bench for this purpose having a novel die holder arranged for the constant circulation of heating fluid.

A sixth important object of the invention is to provide novel means for cooling the tubes after they have been drawn through the dies.

A seventh important object of the invention is to provide novel means for stripping the tubes from the mandrels used herein.

With the above and other objects in view the invention consists in general of a novel and improved method of drawing and sizing tubes of thermo-plastic material hereinafter set forth, and of an improved draw-bench having certain novel details of construction and combinations of parts hereinafter fully described and illustrated in the accompanying drawings, the method and apparatus being particularly pointed out in the appended claims.

In the accompanying drawings like characters of reference indicate like parts in the several views, and—

Figure 1 is a plan view, partly broken away, of one form of draw-bench adapted for use in carrying out the method and forming one embodiment of the apparatus of this invention.

Figure 2 is a side elevation thereof.

Figure 3 is a plan view of a second form of draw-bench used in connection with this invention.

Figure 4 is a side elevation, partly in section, of this second form.

Figure 5 is an enlarged detail section on the line 5—5 of Fig. 1.

Figure 6 is a section on the line 6—6 of Fig. 5 with the mandrels and tubes omitted.

Figure 7 is an enlarged side elevation of a bench hook used with the improved draw-bench.

Figure 8 is a bottom plan view of the device shown in Fig. 7.

Figure 9 is a perspective view of a stripper plate used herewith.

Figure 10 is a side elevation of a bench hook for use in connection with the stripper plate, and Figure 11 is a bottom plan view of the hook shown in Figure 10.

Each draw-bench shown in the accompanying drawings includes a head member 10 supported on legs 11 and a tail member 12 similarly supported on legs 13, the head and tail members being held in spaced relation by tie-bars 14. Shafts 15 are journalled in the head and tail members and carry sprockets 16 over which is trained a chain 17. In the bench shown in Figures 1 and 2, a channel member 18 also connects the members 10 and 12 and the upper run of the chain 17 moves over this channel.

In each form of the invention, the head 10 has mounted therein a cylindrical housing 19 having at one end a die holder plate 20 which is secured to the housing 19 by screws 21. This plate 20 is provided with a pair of shouldered openings 22 arranged with their smaller ends toward the interior of the housing. In each of these openings 22 there is fitted a die 23 having a shouldered exterior so that it may be held in its opening or seat 22 against movement in one direction by the coacting shoulders of the seat and die. Each die has an opening 24 extending therethrough and has a flaring inlet mouth 25 at the side next the housing 19. The cross-sections of the die openings are made to conform to the external size and shape of the tube to be drawn and may thus have any polygonal or curvilinear cross section desired and may be of any desired size. In connection with these dies there is provided a pair of mandrels 27 which are preferably provided with ogival points 28, but are otherwise of uniform cross section. These mandrels have cross-sections conforming to the shape and size of the interior of the tubes when drawn and may, as with the dies, be of any desired shape and size. On the plate 20 seats a cover plate 29 having openings 30 registering with the die openings, the plate 29 covering the peripheral portions of the dies to hold them in their seats. The rear of the housing or cylinder 19 has mounted thereon a plate 31 provided with openings 32 aligned with the die openings so that the mandrels and the tubes may move through these openings 32 and dies. The plates 29 and 31 are held in position by bolts 32'.

In the upper wall of the housing or cylinder 19 is formed a chamber 33 which communicates with the interior of the housing 19 through a multiplicity of small jet orifices 34. A screw threaded opening 35 leads from the exterior of the housing to the chamber 33 so that a supply pipe 36 may be connected to the housing to supply the housing with hot fluid such as steam, hot air or other fluid.

The tail shaft 15 is driven by any suitable means as at 37 to cause the chain 17 to move in the direction of the arrow in Fig. 2. In order to draw the mandrels forwardly there is provided a body member or bar 38 having angularly disposed ends 39. On the bar 38, adjacent one end thereof, is bolted a bearing block 40 wherein is journalled a rock shaft 41 having arms 42 provided with angularly disposed ends 43. The rock shaft 41 has a flat 44 formed thereon which normally rests on the bar 38 to hold the yoke, formed by the rock shaft and its arms, in operative position. However, the flat is quite narrow so that the yoke may be forcibly turned out of operative position when desired. Also, the bar 38 is provided with a series of bolt holes 45 so that the bearing block, and consequently the yoke, may be secured to the bar in selected position.

The forward end of each mandrel is provided with an opening 46 and, during the drawing operation, a pin 47 is passed through these openings with its ends projecting as shown in Figure 2. The bar 38 has one end 39 hooked into the chain 17 and the arms of the yoke are hooked on the projecting ends of the pin 47 so that movement of the chain is in the direction of the arrow A.

In the form of the invention shown in Figures 1 and 2, the upper run of the chain moves away from the head 10 during the drawing operation and the bench hook is engaged with this upper run. In the form of the invention shown in Figures 3, 4 and 6, the lower run of the chain moves away from the head 10 and the bench hook is correspondingly engaged beneath this lower run.

In both forms of the invention, there is provided means for preliminarily cooling the tubes upon their issuance from the dies. One of the arrangements for effecting this preliminary cooling is to provide a cold water supply pipe 48 having a sprinkler head 49, as shown in Figures 1 to 4 inclusive. As shown in Figures 1 and 2, the sprinkler is positioned above the tubes, and as shown in Figures 3 and 4, the sprinkler is positioned below the tubes. Instead of using cold water, any other suitable cooling medium may be employed, such as cold or refrigerated air, which may have its humidity controlled. This preliminary cooling tends to prevent any warping of the tubes until they are further cooled by immersion in the final cooling medium. For final cooling, there is provided in each form of the invention a cooling tank 50 which may contain cold water or any other desired cooling medium. If desired, there may be incorporated in the cooling tank 50 a refrigerating element 50a. As hereinafter described, the tubes are then removed from their mandrels. It is to be noted that the final cooling does not shrink the tubes sufficiently to prevent the relatively easy removal from their mandrels, as hereinafter pointed out.

In the form of the invention shown in Figures 1 and 2, the lower run of the chain passes through the cold water tank to cool the chain. In the form of the invention shown in Figures 3 and 4, when the bar 38 is disconnected from the mandrels, then the mandrels and the tubes when they have passed clear of the dies, are automatically released and fall into the cooling tank 50, which is so positioned to receive the tubes and their mandrels, and thus eliminate, to a large extent, an extra handling operation, which must be performed in connection with that form of the invention shown in Figures 1 and 2.

To arrange for stripping the tubes from the mandrels, there is provided a bar 51 having a series of holes 52 therein of such size as to fit closely around the mandrels. To use this bar the die is removed and the bar placed across the head. The base portions of the mandrels are passed through the holes and the bench hook shown in Figs. 10 and 11 applied. This bench hook consists of a bar 55 having an angularly disposed end 56. The other end of the bar is flattened as at 53 and bolted to the sides of the flattened portion is a pair of hooks 54. Three or more tubes are stripped at a time and the pin 47 is passed through three mandrels so that the hooks 54 engage between the middle and outer mandrels. The hook 52 is engaged in the chain and the latter operated as before. This will draw the mandrels out of the tubes.

Instead of removing the die on the draw bench, a separate draw bench may be provided similar to the one shown, but without the die and steam chest, and the bench hook 51 applied thereto, as described in connection with the draw bench, as shown. The manner in which the bench hook 51 is used is identical with the operation previously described. This latter arrangement of separate draw benches for drawing the tubes to size and for removing the drawn tubes from their mandrels is preferred, as it enables the drawing operation in the removal of the tubes from their mandrels to be substantially continuous.

In operation the thermo-plastic tubing is suitably softened and rendered plastic. This may be done by heating as by immersion in hot water, or by treatment with a suitable solvent. However, treatment with hot water is preferred. This preliminary step of treating the material to be drawn to render the same plastic is the first step in the present method. The plastic tubing is now drawn on the proper size and shape of mandrel, which has preferably been preheated and the forward or pointed end of the mandrel is inserted through the housing with the point projecting through the die. Heating fluid such as steam is now permitted to flow into the housing and this heats the dies, the tubing and the mandrels so that they all are of substantially the same temperature, the degree of heat being sufficient to maintain the tubing in a plastic condition. It is to be understood that prior to the drawing operation, the tubing is somewhat larger than the openings in the dies, as shown in Fig. 5.

The draw bar having been applied to connect the mandrel and chain, the latter is moved by the driving means 37 and the mandrels with the tubing on them are forced through the dies, thus reducing the tubing and causing it to conform in size and shape to the die openings. Meanwhile, the supply of heating fluid is maintained and, as the mandrels are moved through the dies, the parts of the tubing and mandrels moving through the dies are kept at a constant temperature so that the tubing is uniformly plastic as it is moved through the dies. By thus maintaining the tubing in a uniformly plastic condition as it is acted upon by the dies, the resultant product is uniformly sized and no unevenness occurs such as would result were the temperature of the tubing allowed to change during its passage through the dies.

It is to be noted that the tubes are sized interiorly and exteriorly, and that the above operation may be applied to tubes of any shape or configuration. The exterior of the tubes may be drawn to a round or cylindrical shape, or to a paneled surface. For example, the exteriors of the tubes may be drawn by the use of suitable dies, so that these tubes have six, eight or twelve sides or panels to produce a paneled tube well known in the art. The tubes, after they pass through the dies, and while still on their mandrels, are sprayed, as shown, with a cooling medium, such as cold water or air, to effect a preliminary cooling and then, upon removal from the chain, drop into a final cooling medium, as for example in the tank 50, containing cold water. The tubes, while still on their mandrels are allowed to stay in the cooling medium for a sufficient length of time to effect the cooling, which will depend upon many factors, including the composition and thickness of the tube and, thereafter, the tubes are removed from their mandrels in either manner already described. The tubes, for example, may remain in the cooling tank 50 for about 15 seconds to a minute. The temperature of the cooling medium may be varied in order to control the time of immersion. The cooler the cooling medium the quicker the tube is cooled.

It is to be observed that the small jets 34 cause the heating fluid to be distributed evenly in the housing so that all parts are equally heated. It is also to be noted that the interior of the housing may, if desired, be electrically heated, the important result to be obtained being to maintain the interior space of the housing at a uniform temperature. It is also important that the mandrels and the tubing thereon shall be moved through the housing at such speed as to afford time for them to attain a temperature equal to that of the housing space and consequently equal to that of the dies.

There has thus been provided a novel and improved method and apparatus for carrying the method into effect, such method and apparatus being of the kind described and for the purpose specified.

It is to be understood that while the apparatus disclosed illustrates one apparatus for the purpose, yet the method may be carried out by other forms of apparatus.

What is claimed is:

1. In a tube drawing apparatus for tubes of thermo-plastic material, a drawing bench having a housing at one end, a die supported at one end of the housing, a mandrel adapted to fit in a tube of plastic material and pass through the housing and die, said housing having a wall provided with a chamber communicating with the interior of the housing through a multiplicity of jet openings, said chamber opening outwardly for connection to a heating fluid supply, and means to force the mandrel through the die.

2. In a tube drawing apparatus for tubes of thermo-plastic material, a drawing bench having a housing at one end, a die supported at one end of the housing, a mandrel adapted to fit in a tube of plastic material and pass through the housing and die, means to supply the interior of the housing with constantly flowing heating fluid, means to force the mandrel through the die, and a supply pipe for cooling fluid positioned to direct a stream of said fluid against the tube as it issues from the die.

3. In a tube drawing apparatus for tubes of thermo-plastic material, a drawing bench having a housing at one end, a die supported at one end of the housing, a mandrel adapted to fit in a tube of plastic material and pass through the housing and die, said housing having a wall provided with a chamber communicating with the interior of the housing through a multiplicity of jet openings, said chamber opening outwardly for connection to a heating fluid supply, means to force the mandrel through the die, and a supply pipe for cooling fluid positioned to direct a stream of said fluid against the tube as it issues from the die.

4. In a tube drawing apparatus for tubes of thermo-plastic material, a drawing bench having a sprocket wheel at each end and a chain trained over said sprocket wheels, the lower run of said chain being downwardly curved, a die provided with heating means adjacent one of said sprocket wheels, tube supporting mandrels adapted to be drawn through said die, a draw bench hook removably connecting said mandrels and chain, and a cooling tank through which the lower run of said chain passes to cool the same.

5. In a tube drawing apparatus for tubes of thermo-plastic material, a drawing bench having a sprocket wheel at one end, a chain trained over said sprocket wheel and having upper and lower runs, a die support mounted at said end of the bench to support a die below the level of the lower run of said chain, a die mounted in said support, a mandrel movable through said die, a bench hook at the underside of the lower run of said chain and detachably connecting the mandrel and chain, means to heat the die support, cooling means ejecting a stream of cooling fluid axially of the mandrel as it is drawn through said die, and a cooling tank below said chain and positioned to receive the mandrels and tubes therein upon being drawn clear of said die.

6. A continuous process for the shaping of a thermo-plastic tube by drawing it through a heated die, comprising seating a thermo-plastic tube on a mandrel, then progressively heating said tube to soften it as it is being drawn by applying heat over a small section only of the tube immediately before said section enters the die and drawing the tube through the die to simultaneously and continuously size and shape the interior of the tube to the size and shape of the mandrel, and the exterior of the tube to the size and shape of the die, continuously preliminarily cooling the tube as it issues from the die by flowing a cooling medium in heat exchange with said tube to prevent warping thereof, and finally cooling the sized and shaped tube by immersing the same in a cooling bath.

7. A continuous process for the shaping of a thermo-plastic tube by drawing it through a heated die, comprising seating a thermo-plastic tube on a mandrel, then progressively heating said tube to soften it as it is being drawn by applying heat over a small section only of the tube immediately before said section enters the die and drawing the tube through the die to simultaneously and continuously size and shape the interior of the tube to the size and shape of the mandrel, and the exterior of the tube to the size and shape of the die, continuously and progressively spraying the tube with a cooling medium as it issues from the die to prevent warping thereof, and finally cooling the sized and shaped tube by immersing the same in a cooling bath.

8. In a tube drawing apparatus for tubes of thermo-plastic material, a drawing bench having a sprocket wheel at each end and a chain trained over said sprocket wheel, the lower run of said chain being downwardly curved, a housing adjacent one of said sprocket wheels, a die supported at one end of the housing, a mandrel adapted to fit in a tube of plastic material and pass through the housing and die, said housing having a wall provided with a chamber communicating with the interior of the housing through a multiplicity of jet openings, said chamber opening outwardly for connection to a heating fluid supply, a draw bench hook removably connecting said mandrel and said chain, and a cooling tank through which the lower run of said chain passes to cool the same.

DAVID KAHN.
JULIUS KAHN.